May 29, 1956 B. H. GWYNN 2,748,168
HYDROFORMYLATION PROCESS USING COIL REACTOR
Filed Dec. 30, 1950
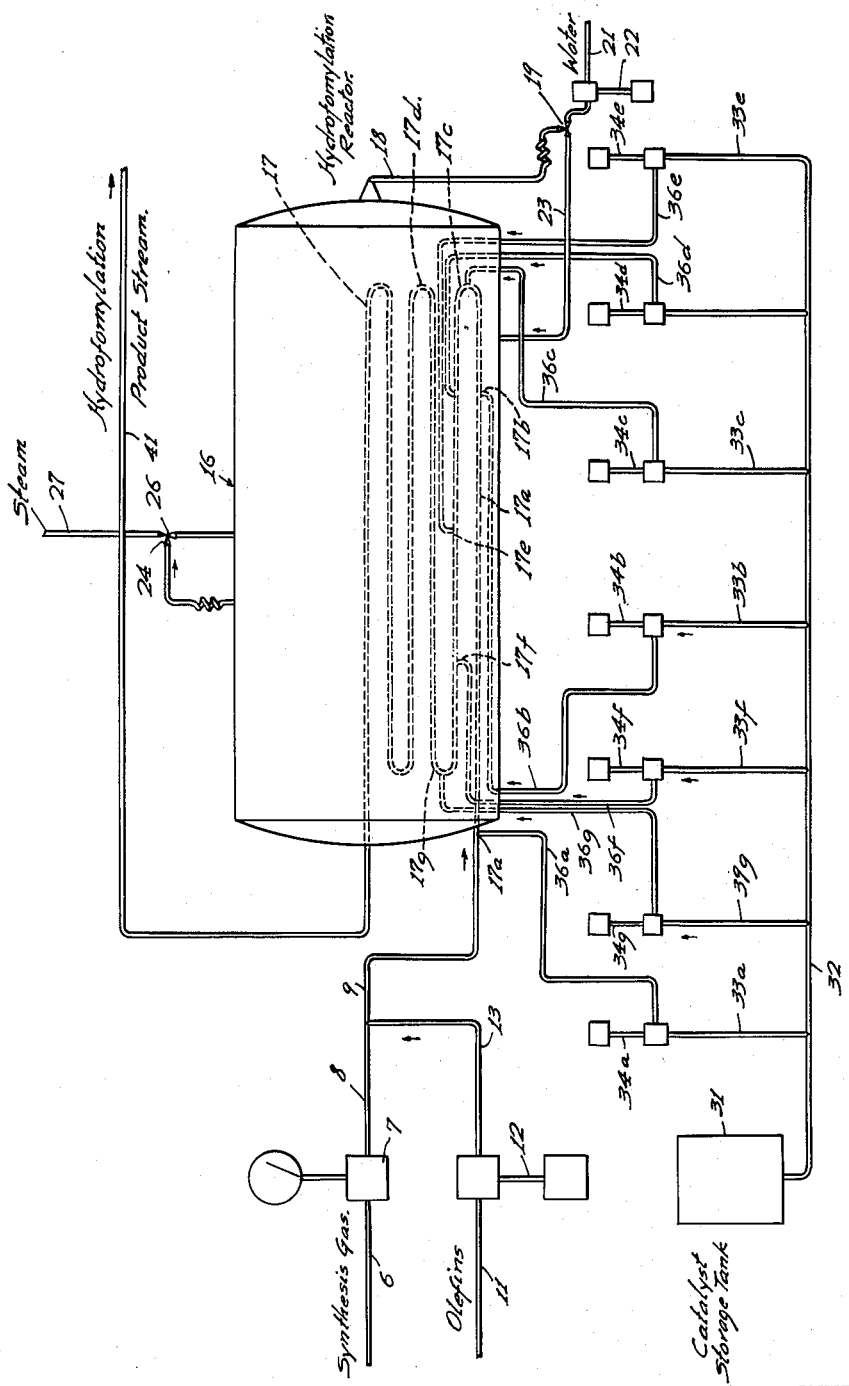
INVENTOR.
Bernard H. Gwynn.
BY
his ATTORNEY.

though greater variations in temperature can be tolerated with a consequent loss in optimum yields.

2,748,168
HYDROFORMYLATION PROCESS USING COIL REACTOR

Bernard H. Gwynn, Fawn Township, Allegheny County, Pa., assignor to Gulf Research & Development Company, Pittsburgh, Pa., a corporation of Delaware Application December 30, 1950, Serial No. 203,589

2 Claims. (Cl. 260—604)

This invention relates to a process for carrying out hydroformylation reactions. More particularly, the invention relates to an improved process for continuously hydroformylating olefins.

The hydroformylation or Oxo reaction is becoming increasingly important as a means of synthesizing organic compounds. While the charge materials for the reaction are usually olefins and carbon monoxide and hydrogen, which are contacted with a suitable catalyst, other charge materials can be used, resulting in the production of a variety of organic compounds. An article describing the scope of use of the hydroformylation reaction appeared at page 3881 of volume 28, No. 45, of the Chemical and Engineering News. When olefins and carbon monoxide and hydrogen are the charge materials, the olefins are largely converted to aldehydes by the addition of a hydrogen atom to a carbon atom joined to another carbon atom by a double bond in the olefin, and by the addition of a formyl group to the other carbon atom joined by the same double bond. Other reactions occur during the hydroformylation of olefins and produce compounds such as alcohols, acetals, and the like. Although the present invention relates to hydroformylation reactions generally, it is particularly concerned with such reactions in which an olefin or a mixture of olefins is a charge material, and therefore the following specific description will largely be restricted to reactions involving these compounds.

Hydroformylation may be carried out as a process for the production of aldehydes, or it may be employed as the first stage of a multistage process in which the aldehydes produced in the hydroformylation stage are employed as intermediate reaction products. For example, hydroformylation is employed as the first stage in the Oxo process. The aldehydes which are produced are then converted to alcohols in the second or hydrogenation stage of the Oxo process.

A catalyst is necessary for the hydroformylation of olefins. In the hydroformylation stage of the Oxo process, for example, it has been proposed to employ a Fischer-Tropsch catalyst. It is also necessary to employ superatmospheric pressures during the hydroformylation of olefins, and pressures in the range of 750 to 10,000 pounds per square inch have been proposed.

It is difficult to convert olefins to aldehydes by hydroformylation not only because of the hydroformylation pressures which are necessary but also because hydroformylation requires closely controlled elevated temperatures in the range of 100° to 600° F. The problem of heat control necessary to maintain hydroformylation temperatures is further complicated because a rather long reaction period is needed in order to obtain satisfactory results. In addition it is necessary in hydroformylating olefins to first raise the reactants to a temperature at which hydroformylation occurs at a reasonable rate, and then when this rate is obtained, to remove a large amount of heat in order to control the reaction because the hydroformylation reaction is very exothermic. All this must be done under essentially isothermal conditions since for any given partial pressure of carbon monoxide there is an optimum temperature of operation which must be maintained to obtain maximum yields.

I have found that hydroformylation reactions can be continuously and efficiently carried out under accurately controlled temperature conditions by a process comprising flowing the reactants through an elongated reaction zone in indirect heat exchange relationship with a heat transfer medium, and introducing the catalyst in a plurality of portions at spaced intervals along the reaction zone. As will be pointed out, when operating in this manner excellent throughputs can be obtained.

Any type of hydroformylation catalyst can be employed in the reaction zone. A slurry type catalyst or a water solution of a catalytic metal salt can be employed, but preferred results are obtained when a catalytic metal salt, preferably a cobalt or iron salt, soluble in olefins is introduced to the reaction zone. Especially preferred results are obtained when the catalyst employed is introduced as a cobalt salt soluble in olefins such as cobalt naphthenate, or cobalt salts of higher aliphatic acids such as ethylhexanoic acid, lauric, palmitic, and stearic acids. These salts are converted to cobalt carbonyl and cobalt hydrocarbonyl in the reaction zone and it has been postulated that these latter materials are the catalytically active agents in the hydroformylation reaction.

Hydroformylation is preferably carried out in the present process at selected temperatures within the range of about 260° to about 460° F., the optimum temperature depending upon the carbon monoxide partial pressure and the catalytic metal salt employed. When the catalytic metal salt is a cobalt salt, the hydroformylation temperature should be a temperature within the above range and below 440° F. Optimum results are obtained when the temperatures are selected from the range of about 340° to about 380° F. When the catalytic metal salt is an iron salt, preferred results are obtained when the hydroformylation temperatures are selected from the range of about 360° to about 460° F.

Any hydroformylation pressure and any synthesis gas composition can be employed with the process of my invention. Preferred results are obtained when the total hydroformylation pressure is in the range of 1500 to 7500 pounds per square inch and the synthesis gas contains hydrogen and carbon monoxide in a mol ratio from about 0.5:1 to 8:1, the total pressure and the composition of the gas being selected to obtain a carbon monoxide partial pressure from about 750 to about 4000 pounds per square inch. When operating with a partial pressure of carbon monoxide in this range, excellent yields are obtained by introducing a cobalt catalyst in a plurality of portions at spaced intervals along a reaction zone maintained at temperatures between about 285° and 430° F. Especially preferred results are obtained with a total pressure from about 3000 to about 4500 pounds per square inch, and a synthesis gas with a mol ratio of hydrogen to carbon monoxide of about 1:1, the partial pressure of carbon monoxide being about 1500 to about 2250 pounds per square inch. When introducing portions of cobalt catalyst at spaced intervals along a reaction zone in which the carbon monoxide partial pressure is in this range, optimum yields are obtained with temperatures in the range of between about 340° and 380° F. When an iron catalyst is employed instead of a cobalt catalyst higher temperatures should be employed to obtain optimum yields with the same carbon monoxide partial pressure.

In order to obtain best yields of the desired products during hydroformylation selected hydroformylation temperatures depending upon the partial pressure of carbon monoxide employed should be maintained within a closely controlled range. Preferred results are obtained when the range does not exceed 20° F.

I have found that when all of the catalyst is introduced with the reactants at the beginning of the hydroformylation reaction zone, a major proportion of the reaction occurs in the first part of this zone. As a result of this, the major part of the exothermic heat must be removed in the first portion of the reaction zone in order to maintain the temperature below a desired maximum hydroformylation temperature and prevent deposition of cobalt by thermal decomposition of the cobalt carbonyls with attending decrease in catalyst concentration in the remainder of the reactor and a corresponding decrease in reaction rate. By introducing a catalytic metal salt at intervals along the reaction zone, the maximum rate of heat release can be reduced and the rate of heat release can be made more uniform. As a result of this, better temperature control can be obtained with a consequent improvement in the yield of desired reaction products. At the same time, reactors for the hydroformylation of olefins can be designed and operated more efficiently. As an example, for any given set of hydroformylation reaction heat transfer conditions, the maximum amount of heat which can be removed determines the maximum diameter of the reaction zone. By introducing the catalyst metal salt at more than one point, and thus requiring a decreased maximum rate of heat removal per volume of olefins hydroformylated, the process of my invention permits the use of a larger maximum diameter reaction zone and hence a greater throughput under any set of reaction and heat transfer conditions.

Any olefin or mixture of olefins can be hydroformylated in accordance with the process of my invention, but preferred results from a commercial viewpoint are obtained when the olefins contain at least 4 carbon atoms, and especially preferred results are obtained when the olefins contain 4 to 16 carbon atoms. Examples of suitable olefins which can be used are hexenes, heptenes, octenes such as diisobutylenes, triisobutylenes, and tetraisobutylenes, and mixtures of these. A mixture of olefins can contain both 1-olefins and olefins with a non-terminal double bond. In general, because the latter are first converted to 1-olefins, a somewhat longer reaction time or residence period is usually necessary when the mixture includes 2-olefins and the like. However, by adjusting reaction conditions any mixture of olefins can be efficiently hydroformylated in a residence time of from about 5 to about 30 minutes.

The composition of the mixture of hydrogen, carbon monoxide and the olefins introduced to an elongated hydroformylation reaction zone in accordance with the process of my invention is not critical. In general, in order to insure as complete reaction of the olefins as possible, the composition of the mixture is adjusted so that hydrogen and carbon monoxide are present in amounts greater than those needed for complete reaction with the olefins plus that dissolved so that the full partial pressure of carbon monoxide is exerted throughout the reactor. The relative amounts of hydrogen and carbon monoxide can also be varied. As pointed out above, the mol ratio of these gases can be from 0.5:1 to 8:1, but preferred results are obtained when the mol ratio of hydrogen to carbon monoxide is about 1:1.

In a preferred embodiment of the invention a coil-type reactor immersed in a bath of boiling liquid such as water is employed for carrying out the process. The reactor can readily be made of sufficient length so that adequate reaction time can be obtained. The length of the coil can be increased so that the coil is sufficiently long to contain a preheating zone and a hydroformylation reaction zone. Excellent heat transfer is obtained by the fluids within the coil and the liquid boiling outside the coil. This is true in the portion of the coil which is used for preheating and the portion of the coil used for the reaction.

In accordance with the invention, catalyst is introduced at intervals along the reaction portion of the coil. The number of places at which catalyst is introduced into a hydroformylation zone for optimum results depends in each case upon a balance between the advantages of obtaining as uniform reaction conditions throughout the coil as possible and the costs of adding additional inlet lines and the necessary equipment used in connection with these lines.

The same or different amounts of catalyst can be added to the reaction zone by each catalyst inlet line. The amount of catalyst added in the various lines can be controlled manually or by mechanical means. If desired, temperature sensitive devices can be inserted in the reaction zone at or before the various points where catalyst is added and metering equipment connected to the temperature sensitive devices can be employed for controlling the amount of catalyst introduced in the various catalyst inlet lines.

In determining the location of points in the reaction zone at which catalyst should be introduced for best results, and the amounts of catalyst introduced at these points, the fact that only a part of the catalyst is present in part of the reaction zone and that therefore the maximum possible reaction rate is reduced in that part of the reaction zone and thus the maximum possible conversion of olefins to aldehydes is also reduced must also be considered. The effect of varying the addition of catalyst depends upon the type of reaction and the extent to which it is affected by the catalyst concentration.

The present process is especially effective as I have found the reaction rate is almost directly dependent upon the catalyst concentration and there is an optimum hydroformylation temperature at which the maximum reaction rate is obtained.

In general, preferred results are obtained in hydroformylating olefins in accordance with the invention by introducing the catalyst at intervals in the first third of the reaction zone and by adjusting the amounts of catalyst introduced at these various points so that the amounts of olefins converted in each increment between the points of introduction are substantially the same.

A method of carrying out an embodiment of my invention in which a coil-type reactor is employed in this manner will now be described in connection with the accompanying drawing. The single figure is a simplified flow sheet of a reactor system in accordance with the process of my invention.

Referring to the drawing, synthesis gas with a hydrogen to carbon monoxide ratio of about 1:1 is introduced at a rate of about 870,000 standard cubic feet per stream day by means of line 6 to compressor 7. The gas is compressed to a pressure of about 3500 pounds per square inch at a temperature of about 350° F. The compressed gas is passed by line 8 to line 9. About 160 barrels (42 gallons per barrel) of heptenes are introduced by line 11 to pump 12 and the olefins at a pressure of about 3500 pounds per square inch and a temperature of about 90° F. are passed by line 13 to line 9. The olefins and synthesis gas mix in line 9 and are passed at a pressure of about 3500 pounds per square inch and a temperature of about 200° F. to the hydroformylation reactor 16, the partial pressure of the carbon monoxide being about 1750 pounds per square inch. The mixture of olefins and synthesis gas enters the hydroformylation reactor 16 at the beginning of the coil reactor 17 at point 17a near the bottom of the hydroformylation reactor. The coil is made up of about 2500 feet of three inch inside diameter tubing. It is maintained in a constant level of boiling water by means of liquid level controller 18 which actuates valve 19 and admits about 3500 gallons of water per stream day into the hydroformylation reactor through line 21, pump 22, and then through line 23 which contains valve 19.

The temperature in the coil reactor is maintained at about 360° F. by adjusting pressure control regulator 24 to operate valve 26 in reactor discharge line 27 at about 103 pounds per square inch gauge pressure. Under these conditions about 28,000 pounds of steam are discharged through line 27.

Cobalt 2-ethylhexanoate dissolved in sufficient solvent naphtha to form a liquid containing about 6 weight per cent cobalt as cobalt 2-ethylhexanoate is stored in catalyst storage vessel 31. About 660 pounds of the cobalt 2-ethylhexanoate solution per stream day are passed at a temperature of about 90° F. from catalyst container 31 by line 32. About 250 pounds per stream day are withdrawn from line 32 by line 33a and are passed to pump 34a. The cobalt 2-ethylhexanoate solution is then passed at a pressure of about 3500 pounds per square inch by line 36a to the beginning of the coil reactor 17 at 17a.

The mixture of olefins, synthesis gas, and cobalt 2-ethylhexanoate is heated in the first, or preheating portion of the coil which extends in this case about 120 feet from the beginning of the coil at 17a to the end of the preheating section at 17a'. As soon as the mixture has been heated to a temperature of about 300° F. and the desired cobalt catalyst has been prepared dissolved in the olefins in mixed fluid phase, the hydroformylation reaction begins. Because only a portion of the cobalt salt has been introduced, the temperature of the reaction is readily maintained below 360° F. and controlled within a range of about 20° F. in the coil reactor.

Cobalt 2-ethylhexanoate is introduced from line 32 to each of a number of points which are spaced along the coil reactor 17 at 17b, 17c, 17d, 17e, 17f, and 17g. The pounds of cobalt 2-ethylhexanoate solution introduced at 115 foot intervals along the coil at points 17b to 17g are as follows: 18, 24, 27, 34, 40, 52 and 215. Cobalt 2-ethylhexanoate solution is introduced to these points by systems which are parallel to the one used for introducing the cobalt salt solution to point 17a. The elements are designated by the same number to which an appropriate letter is added. The hydrogenation products are removed from coil 17 by line 41 and are passed to separation units, not shown.

By operating in this manner excellent temperature control can be obtained and the coil reactor can be employed to produce the maximum throughput under any conditions of operation. The maximum temperature difference over any cross section of the coil is 20° F. The olefins are about 66 per cent converted to aldehydes producing about 46,500 pounds of C₈ aldehydes per stream day.

As has been stated previously, when catalyst or a catalytic metal salt is introduced at intervals along the coil reactor, the maximum throughput can be maintained for any set of reaction conditions. Various residence periods such as from 5 to 30 minutes can be employed. The amounts of catalyst introduced at the various points can be kept constant or the amounts can be varied at each of the points. By operating in accordance with my invention the temperature will not vary more than about 20° F. over any cross section throughout the reaction zone while maximum throughput is obtained without deposition of catalyst on the walls of the reaction zone.

Although the present process is especially valuable when employed for the hydroformylation of olefins, it will be understood that it has substantial advantages when used for carrying out other hydroformylation reactions, such as those referred to previously.

Obviously many modifications and variations of the invention, as hereinbefore set forth, can be made without departing from the spirit or scope thereof and therefore only such limitations should be imposed as are indicated in the appended claims.

I claim:

1. A process for controlling the temperature of a hydroformylation reaction in an elongated coil reactor to maintain substantially isothermal reaction conditions therein which comprises maintaining said elongated coil reactor immersed in a bath of a heat transfer medium, passing a synthesis gas comprising hydrogen and carbon monoxide in a mol ratio of 0.5:1 to 8:1 and an olefin through said elongated coil reactor at selected temperatures within the range of about 260° to about 460° F. and a total hydroformylation pressure of about 1500 to about 7500 pounds per square inch, while simultaneously introducing a hydroformylation catalyst consisting essentially of a cobalt salt of a higher aliphatic acid in portions at spaced intervals in the first third of said elongated reaction zone, and adjusting the amounts of said catalyst introduced at said intervals so that the amounts of olefins converted in each increment between the points of introduction of said catalyst are substantially the same.

2. A process for controlling the temperature of a hydroformylation reaction in an elongated coil reactor having a length of at least about 2500 feet and a diameter of about three inches to maintain substantially isothermal reaction conditions therein which comprises maintaining said elongated coil reactor immersed in a bath of hot water, passing a synthesis gas comprising hydrogen and carbon monoxide in a mol ratio of 0.5:1 to 8:1 and an olefin through said elongated coil reactor at selected temperatures within the range of about 260° to about 460° F. and a total hydroformylation pressure of about 1500 to about 7500 pounds per square inch, while simultaneously introducing a hydroformylation catalyst consisting essentially of a cobalt salt of a higher aliphatic acid in portions at spaced intervals in the first third of said elongated reaction zone, and adjusting the amounts of said catalyst introduced at said intervals so that the amounts of olefins converted in each increment between the points of introduction of said catalyst are substantially the same.

References Cited in the file of this patent

UNITED STATES PATENTS

| | | |
|---|---|---|
| 2,250,421 | Riblett | July 22, 1941 |
| 2,437,600 | Gresham et al. | Mar. 9, 1948 |
| 2,473,995 | Gresham et al. | June 21, 1949 |
| 2,477,554 | McKeever | July 26, 1949 |
| 2,497,303 | Gresham et al. | Feb. 14, 1950 |
| 2,509,878 | Owen | May 30, 1950 |
| 2,518,474 | Hudson | Aug. 15, 1950 |
| 2,557,701 | Smith | June 19, 1951 |
| 2,664,433 | Hudson | Dec. 29, 1953 |

OTHER REFERENCES

I. G. Farben application I 74 142 IVd/120; Jan. 22, 1943. Translated by C. A. Metzer Co. in pamphlet entitled "Oxo Process"; TOM Reel 36.